(12) United States Patent
Yamashita (10) Patent No.: US 11,113,386 B2
(45) Date of Patent: Sep. 7, 2021

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Takahiro Yamashita, Echizen (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 16/411,853

(22) Filed: May 14, 2019

(65) Prior Publication Data
US 2019/0354677 A1 Nov. 21, 2019

(30) Foreign Application Priority Data
May 17, 2018 (JP) .............................. JP2018-095587

(51) Int. Cl.
*G06F 21/52* (2013.01)
*G06F 21/55* (2013.01)

(52) U.S. Cl.
CPC ............ *G06F 21/52* (2013.01); *G06F 21/552* (2013.01); *G06F 2221/033* (2013.01); *G06F 2221/034* (2013.01)

(58) Field of Classification Search
CPC ............................... G06F 21/52; G06F 21/552
USPC .......................................................... 726/23
See application file for complete search history.

(56) References Cited

U.S. PATENT DOCUMENTS

| | | | | |
|---|---|---|---|---|
| 2013/0339713 | A1* | 12/2013 | Huang | G06F 21/572 713/2 |
| 2014/0237226 | A1* | 8/2014 | Berlin | G06F 9/4406 713/2 |
| 2015/0355842 | A1* | 12/2015 | Liu | G06F 3/068 711/103 |
| 2017/0048070 | A1* | 2/2017 | Gulati | G06F 21/57 |

FOREIGN PATENT DOCUMENTS

JP 2009-301429 A 12/2009

* cited by examiner

*Primary Examiner* — Jacob Lipman
(74) *Attorney, Agent, or Firm* — Canon U.S.A., Inc. I.P. Division (57) ABSTRACT

Various embodiments seek to reduce a risk of abnormal control of a device externally connected to a system due to abnormal software that is altered or the like, or to suppress unnecessary power consumption due to a device that does not operate normally. To this end, verification of software is performed at the time of activation of an image forming apparatus, and when the software is determined to be abnormal as a result of the verification, the image forming apparatus is operated with a restricted use of a device corresponding to the software.

15 Claims, 6 Drawing Sheets

INFORMATION PROCESSING APPARATUS, CONTROL METHOD FOR INFORMATION PROCESSING APPARATUS, AND STORAGE MEDIUM

BACKGROUND

Field

The present disclosure relates to an information processing apparatus that verifies software to be used for controlling a device externally connected to a system, a control method for the information processing apparatus, and a storage medium storing a program that performs the control method.

Description of the Related Art

In recent years, to improve robustness of a system, a technique has been developed that performs some verification of software before operating the software and starts the operation of the software only when a result of the verification is valid. With this technique, it is possible to determine that software has been altered or the like when the result of the verification is abnormal, prevent an abnormal operation of the software, and prevent unintended control.

Further, some external devices are connected to the system by a bus such as a universal serial bus (USB), a Peripheral Component Interconnect (PCI), or the like. An example of the external devices may be a Local Area Network (LAN) device connected via a USB, or the like. Some of these external devices need firmware that operates on and controls the external device. Firmware is transferred and loaded to the external device from the system. Accordingly, the firmware of the external device also has a risk of alteration or the like.

Japanese Patent Application Laid-Open No. 2009-301429 discloses a method of detecting alteration of software.

If the firmware used for the external device is altered, this causes a risk of abnormal control of the device due to the altered firmware or a problem of unnecessary power consumption due to a device that does not operate normally.

SUMMARY

Various embodiments of the present disclosure seek to provide a mechanism to reduce the risk of abnormal control of a device due to abnormal software that is altered or the like, or suppress unnecessary power consumption due to the device that does not operate normally, for example.

Various embodiments of the present disclosure provide an information processing apparatus which is connected to a device, and comprises: a controlling unit the device from a main body of the information processing apparatus; a storing unit configured to store software for the device for controlling the device; and a verifying unit configured to perform verification of the software. In a case where the software is determined to be abnormal by the verifying unit, the controlling unit is configured to cause the information processing apparatus to operate in a state that a use of the device corresponding to the software is restricted.

According to various embodiments of the present disclosure, it is possible to reduce a risk of abnormal control of a device due to abnormal software that is altered or the like, or suppress unnecessary power consumption due to a device that does not operate normally.

Further features will become apparent from the following description of exemplary embodiments with reference to the attached drawings.

DESCRIPTION OF THE EMBODIMENTS

Various embodiments for implementing the present disclosure will be described below by reference to the drawings. Note that the scope of the present disclosure is not limited to the scope of the below described embodiments. For example, not all of the combinations of the features described below may be required in other embodiments of the present disclosure.

First Embodiment

Figure 1:
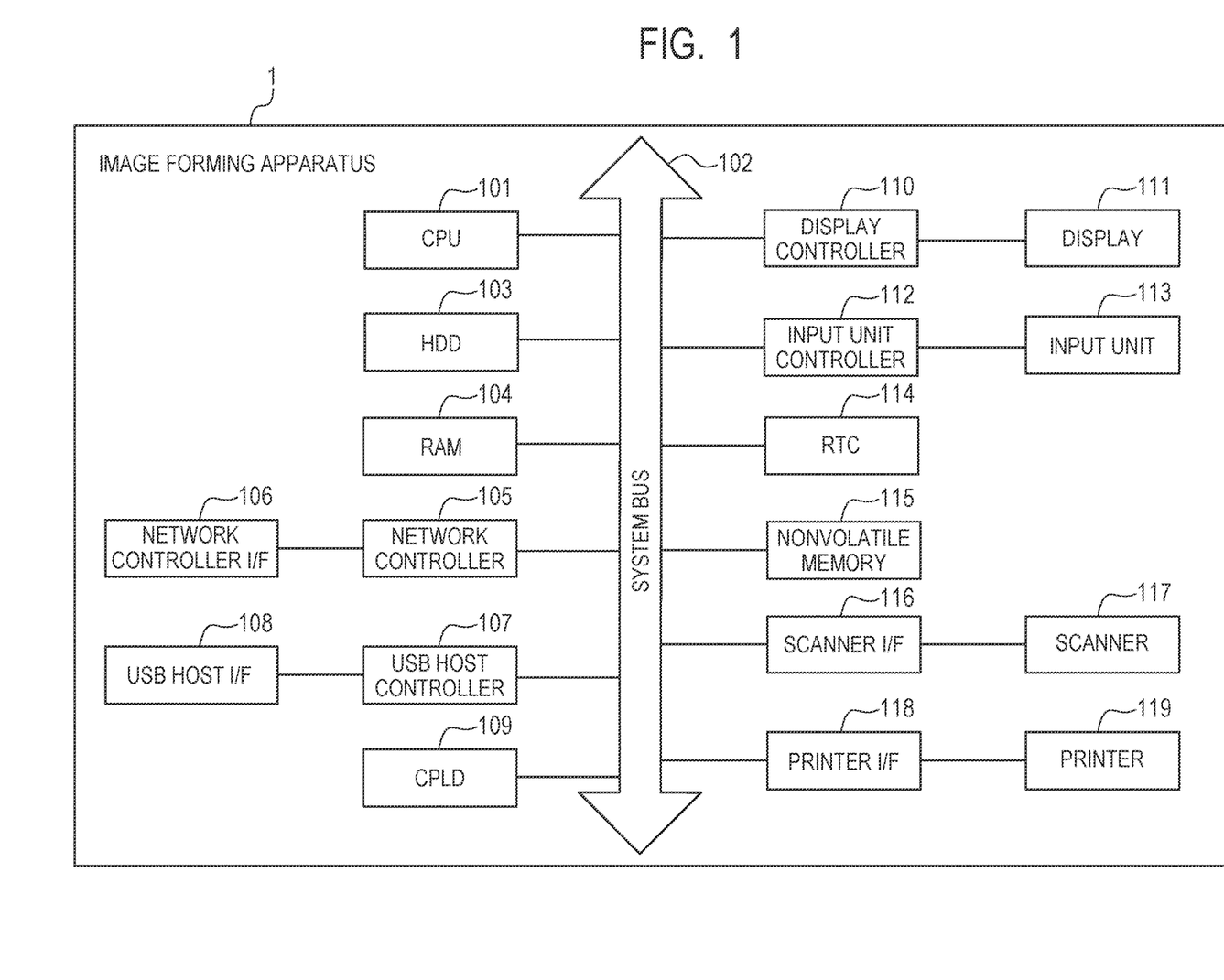
FIG. 1 is a block diagram illustrating an example of a hardware configuration of an image forming apparatus according to one embodiment.

FIG. 1 is a block diagram illustrating an example of a hardware configuration of an image forming apparatus illustrating one embodiment of an information processing apparatus of the present disclosure.

The image forming apparatus 1 illustrated in FIG. 1 constitutes one embodiment of the information processing apparatus of the present disclosure.

In the image forming apparatus 1, a central processing unit (CPU) 101 is a central processing device that operates software that causes the image forming apparatus 1 to operate. A system bus 102 serves as a passage through which the CPU 101 accesses other units and other units access each other. A random access memory (RAM) 104 is a storage region on which a program of the image forming apparatus 1 is expanded and a variable of the program during operation and data are transferred from each unit by the direct memory access (DMA).

A hard disk drive (HDD) (hard disk unit) 103 stores software of the image forming apparatus 1 and a database, a temporary file, or the like required for the operation of the image forming apparatus 1. Note that, although a configuration having the HDD is illustrated in FIG. 1 as an example, a configuration having other storage devices such as a solid state drive (SSD) or the like instead of or in addition to the HDD may be employed.

A network controller 105 and a network controller interface (I/F) 106 communicate with the image forming apparatus 1 and other devices on a network.

A USB host controller 107 and a USB host I/F 108 control communication of the image forming apparatus 1 and the USB device. In FIG. 1, while a single USB host I/F 108 is illustrated, a plurality of USB host I/Fs 108 are present in the actual implementation. The USB host I/F 108 is connected to the USB device by using a USB cable. Some form of the USB devices may be directly connected without using a USB cable.

A display 111 displays the operation status of the image forming apparatus 1 so that the user or the like can confirm the operation status. A display controller 110 performs display control of the display 111.

An input unit 113 receives an instruction from the user to the image forming apparatus 1. An input unit controller 112 controls the input unit 113. Specifically, the input unit 113 is an input system such as a keyboard, a mouse, a numeric key, a cursor key, a touchscreen, or an operating unit keyboard. When the input unit 113 is a touchscreen, the input unit 113 is in a form of being physically attached to the surface of the display 111.

A real-time clock (hereafter, referred to as an RTC) 114 has a clock function, an alarm function, a timer function, or the like of the image forming apparatus 1.

A nonvolatile memory 115 is a rewritable memory, which may be an SRAM, an EEPROM, or the like. Note that SRAM is an abbreviation of "static random access memory", and EEPROM is an abbreviation of "electrically erasable programmable read only memory". Further, the nonvolatile memory 115 may be a non-rewritable memory.

A CPLD 109 is a unit that reads Low/High status of a signal line on a substrate circuit via the CPU 101 or enables the CPU 101 to change the setting of Low/High status. The CPLD 109 is a programmable logic device, which is a unit that enables control of power related OFF/ON on the image forming apparatus 1. Note that CPLD is an abbreviation of "complex programmable logic device". Further, GPIO is present inside the CPLD 109. GPIO is an abbreviation of "General-Purpose Input/Output" and means general input-output. The CPU 101 enables power related OFF/ON by changing a setting value of a GPIO register thereof.

A scanner 117 is a reading device that reads an image from a manuscript. The scanner 117 is connected to the image forming apparatus 1 via a scanner I/F 116 and the system bus 102.

A printer 119 forms an image on a sheet and is connected to the image forming apparatus 1 via a printer I/F 118 and the system bus 102.

Note that use of the image forming apparatus described in the present embodiment is only one example of an information processing apparatus according to the present disclosure. In other embodiments, the information processing apparatus of the present disclosure may be any information processing apparatus to which an external device can be connected via an interface such as USB or the like. Further, the information processing apparatus is not limited to an image forming apparatus and may be a personal computer (PC) or other electronic device or home electric appliances. Further, although the present embodiment is described with an example of control of an external device connected to the information processing apparatus of the present disclosure via a USB, the interface that connects the information processing apparatus to an external device is not limited to a USB.

Figure 2:
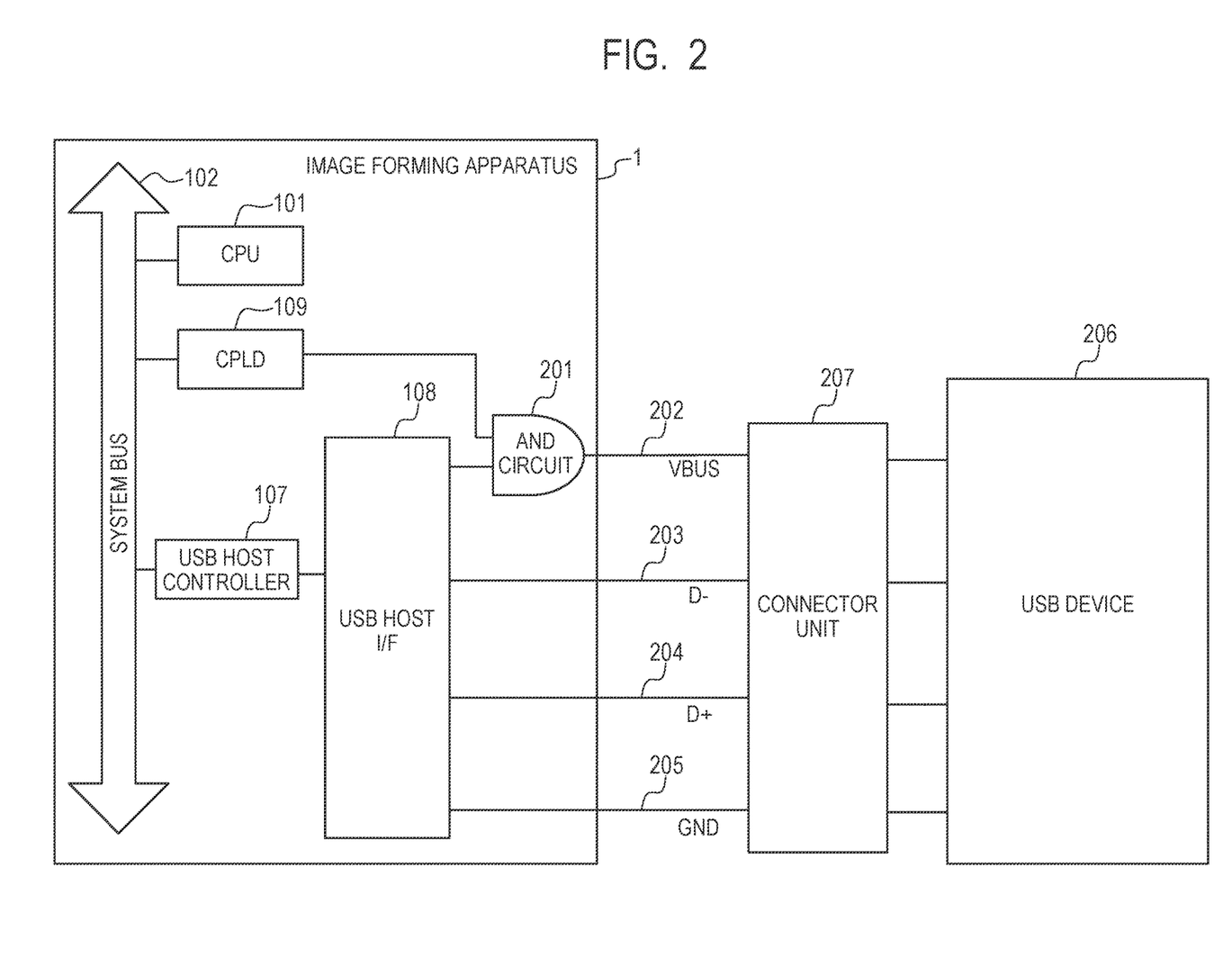
FIG. 2 is a diagram illustrating an example of a connection configuration of the image forming apparatus and an external device according to one embodiment.

FIG. 2 is a diagram illustrating one example of a connection configuration of the image forming apparatus 1 and an external device.

A USB device 206 illustrates one example of the external device connected to the image forming apparatus 1. The USB device 206 is connected to the image forming apparatus 1 via four signal lines. The specification of the USB standard defines that four signal lines are connected to a USB device.

Four signal lines defined by the USB standard are consist of a VBUS 202, a D− 203, a D+ 204, and a GND 205. The VBUS 202 is a power line on which power is supplied to the USB device 206. The D− 203 and the D+ 204 are differential signal lines on which data communicated between the USB device 206 and the USB host controller 107 flows. The GND 205 is a ground signal line.

Note that a connector unit 207 is a connector unit between the USB host I/F 108 and the USB device 206.

An AND circuit 201 calculates a logical product of an output value from the GPIO inside the CPLD 109 controlled in accordance with an instruction of the CPU 101 and an output value of the VBUS output from the USB host I/F 108. Thereby, OFF/ON of the VBUS 202 given to the USB device 206 is switched. FIG. 2 illustrates a configuration that easily controls switching of OFF/ON of the VBUS by using the AND circuit. However, it is possible to control OFF/ON of the VBUS by using a high-side switch and an OR circuit, and other schemes may be used.

Such a configuration enables control of OFF/ON of the VBUS 202 in accordance with an instruction from the CPU 101. That is, by stopping power supply via the VBUS 202 by an instruction form the CPU 101, it is possible to shut off power supply to the USB device 206 and power off the USB device 206.

Figure 3:
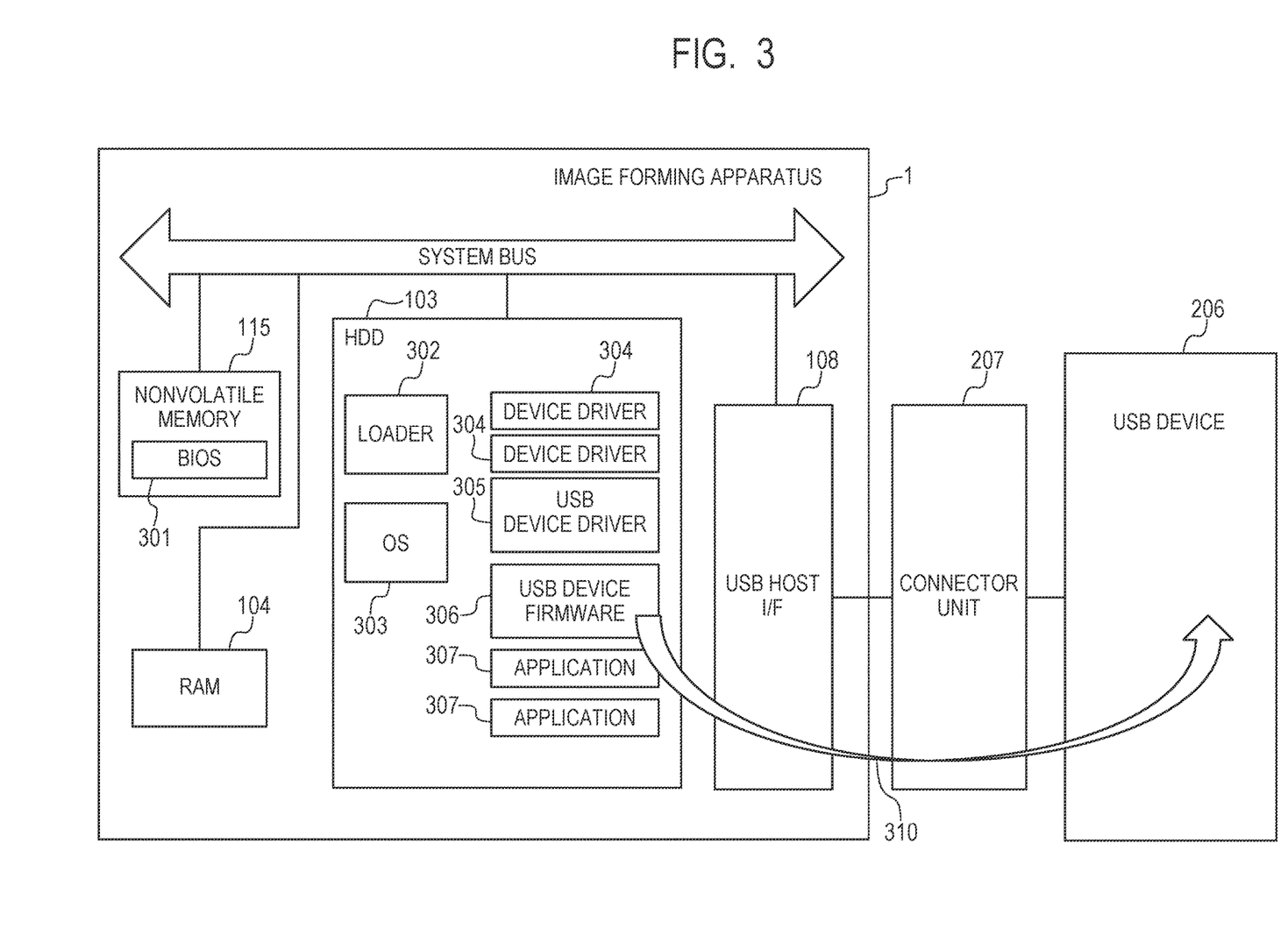
FIG. 3 is a diagram illustrating an example of a storage location of software in the image forming apparatus according to one embodiment.

FIG. 3 is a diagram schematically illustrating a hardware region in which software on the image forming apparatus 1 is stored as an example. The software illustrated in FIG. 3 is one example, and other configurations may be employed. In the following, in the description of a function implemented by the CPU 101 or the like executing software "SW", the function may be described as software "SW" being a subject, such as "SW does . . . ".

First, Basic Input Output System (BIOS) 301 is software used for performing a simple initial setting of each hardware block illustrated in FIG. 1. The BIOS 301 is stored in the nonvolatile memory 115. Note that, when the image forming apparatus 1 is powered on, the BIOS 301 is read from the nonvolatile memory 115 by the CPU 101 and executed.

After initializing the RAM 104, the BIOS 301 expands itself to the RAM 104 and continues the process on the RAM 104. Other software components 302 to 307 are stored in the HDD 103. Note that the BIOS 301 reads a loader 302 described below from the HDD 103 and loads the loader 302 on the RAM 104.

As described above, the loader 302 is loaded on the RAM 104 by the BIOS 301 and executed by the CPU 101. The loader 302 reads operating system (OS) 303 from the HDD 103 and loads the OS 303 on the RAM 104. Thereby, the OS 303 is executed by CPU 101.

The OS 303 performs initialization and resource management of each hardware block, loads a device driver 304 associated with the hardware on the RAM 104 for each hardware, if necessary, and performs the control by using the device driver 304.

The device driver 304 is prepared for each hardware included in the system, and typically, multiple types thereof are stored in the HDD 103. The device driver 304 is a classification of software that operates on the main body side and controls the associated device. Here, the device driver that controls the USB device 206 is particularly distinguished as a USB device driver 305 for the sake of illustration.

Note that some USB device 206 needs a USB device firmware 306 that is loaded on the USB device 206 and executed on the USB device 206 in addition to the USB device driver 305. This is because, for example, it is necessary to continue to supply power to the USB device 206 and control the USB device 206 individually even in a power saving state of the CPU 101. Alternatively, the reason of the above may be from the purpose of hiding the detailed control procedure of the USB device 206 behind the USB device firmware 306 or the like, however, the reason is not limited to the above.

As described above, the USB device firmware 306 is a classification of software that is transferred to the USB device 206, operates on the USB device 206, and controls the USB device 206. Note that the transfer of the USB device firmware 306 to the USB device 206 (310 of FIG. 3) is performed by the USB device driver 305. The time when the USB device driver 305 transfers the USB device firmware 306 (the time of 310) is the time when it is detected that the USB device firmware 306 is updated at the activation of the USB device driver 305. Alternatively, when the USB device 206 is configured without a non-volatile region or the like, the USB device driver 305 may transfer the USB device firmware 306 at every time of activation.

In addition, a plurality of applications 307 are stored in the HDD 103. The applications 307 are for providing the function of the image forming apparatus 1 (for example, a copy function, a print function, a scan function, or the like). Note that the application 307 performs hardware control, if necessary, via a device driver and firmware. As one example, the application 307 receives a print instruction and print data from a PC or the like connected via the network controller I/F 106 and provides a print instruction to the printer 119 via the printer I/F 118.

Figure 4:
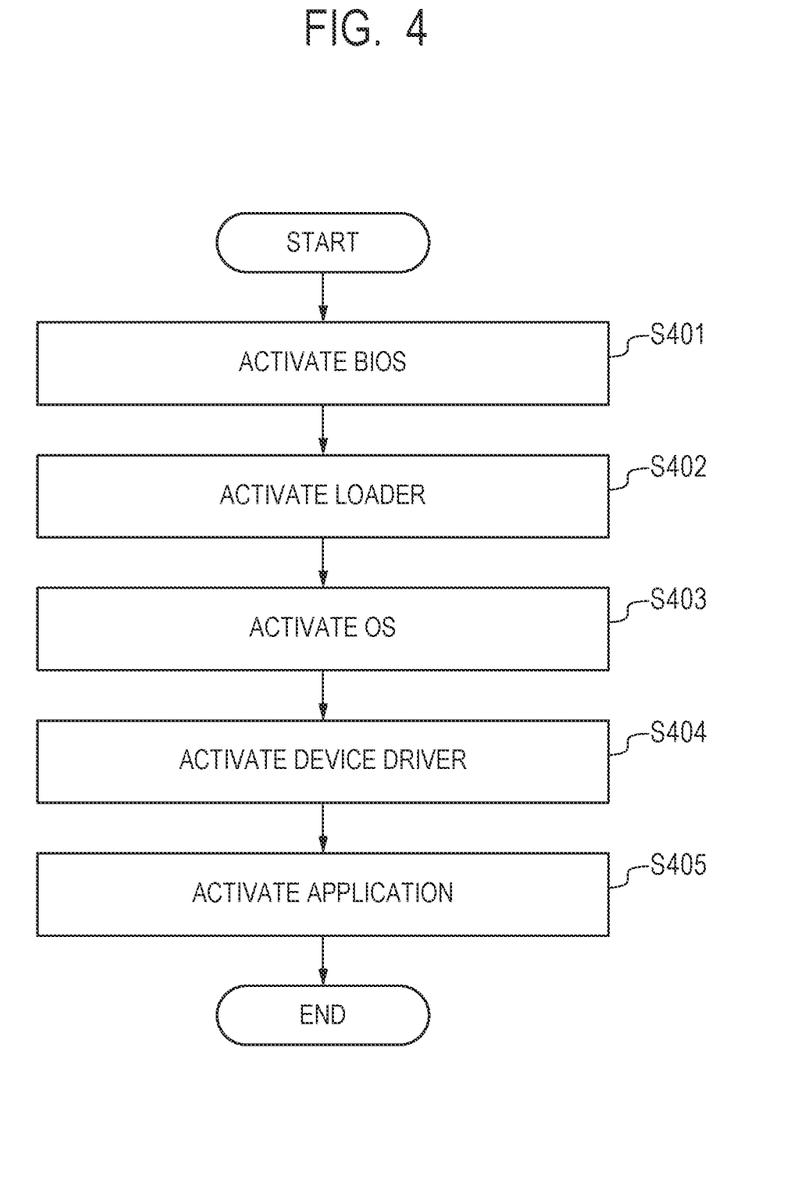
FIG. 4 is a flowchart illustrating one example of an activating process of the image forming apparatus according to one embodiment.

FIG. 4 is a flowchart illustrating one example of an activating process of the image forming apparatus 1.

First, when the image forming apparatus 1 is powered on, the CPU 101 executes the BIOS 301 stored in the nonvolatile memory 115 (BIOS activation; S401). In accordance with the function of the BIOS 301, the CPU 101 performs simple initial setting of each hardware block such as initial setting so that the HDD 103 and the RAM 104 are enabled and causes the hardware block to be accessible by the software of the subsequent stage.

Furthermore, the CPU 101 loads the loader 302 stored in the HDD 103 on the RAM 104 in accordance with the function of the BIOS 301. Here, the CPU 101 performs signature verification of the loader 302 read by using a public key included in the BIOS 301 in accordance with the function of the BIOS 301, and if the result of the verification is normal, transfers the control to the loader 302 (loader activation; S402). Note that the public key described above may be stored in the nonvolatile memory 115.

The CPU 101 reads the OS 303 to be next activated from the HDD 103, expands the OS 303 on the RAM 104, and performs signature verification of the OS 303 in the same manner as the signature verification described above in accordance with the function of the loader 302. If the result of the verification is normal, the CPU 101 transfers the control to the OS 303 (OS activation; S403).

Subsequently, the CPU 101 performs an activating process of the device driver in accordance with the function of the OS 303 (S404). In this activating process of the device driver, the CPU 101 reads the various device drivers 304 and 305 stored in the HDD 103, and performs signature verification of the individual device drivers 304 and 305 in accordance with the function of the OS 303. The device driver may be the device driver that controls the display controller 110, the device driver that controls the USB host controller 107, the device driver that controls the network controller 105, or the like. Out of the individual device drivers, the device driver on which the result of the signature verification is normal is activated. A device corresponding to the activated device driver can be controlled from a subsequent application. An activating process of the USB device driver 305, which is one of the pieces of device driver, will be described below in detail with reference to FIG. 5.

Next, in accordance with the function of the OS 303, the CPU 101 performs signature verification of various applications 307 and activates the application 307 on which the result of the verification is normal (S405). The various applications may include a copy application that manages a copy function, a print application that manages a print function, or the like.

Figure 5:
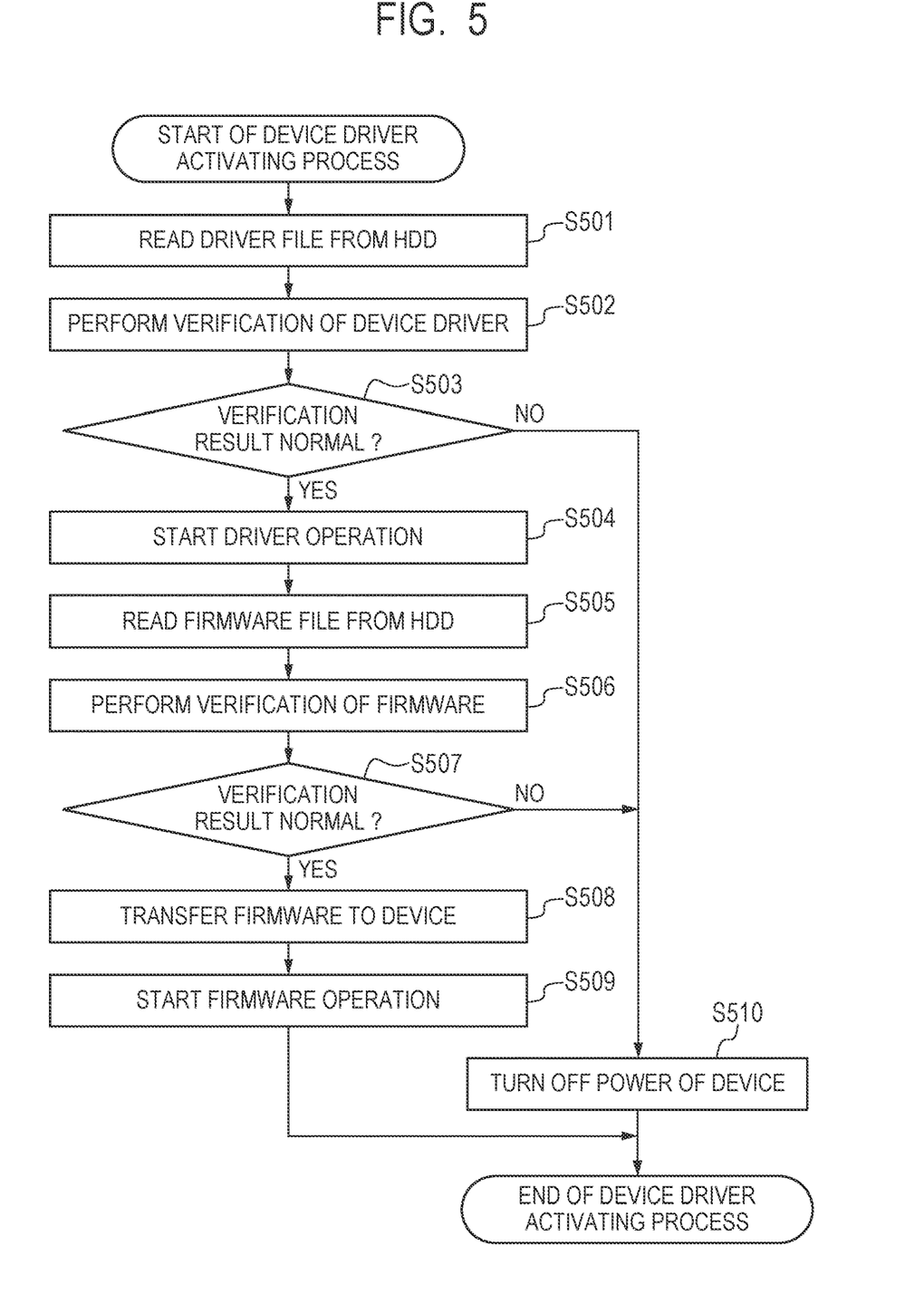
FIG. 5 is a flowchart illustrating an example of an activating process of the external device according to a first embodiment.

FIG. 5 is a flowchart illustrating an example of an activating process of the device driver in the first embodiment. In this activating process of a device driver, verification is performed on the device driver and firmware of an external device (for example, a USB device), and an activating process or power-off control of the device is performed based on the result thereof. Note that this process is performed at least any one of the time when the image forming apparatus 1 is activated, a case where connection of an external device to the main body of the image forming apparatus 1 is detected, and a case where update of a device driver or firmware is detected.

First, the CPU 101 loads the USB device driver 305 on the RAM 104 from the HDD 103 in accordance with the function of the OS 303 (S501).

Next, the CPU 101 performs verification of the USB device driver 305 in accordance with the function of the OS 303 (S502). Since the method of signature verification is well known, the details thereof will not be described here.

Next, the CPU 101 performs determination on the result of the verification of S502 described above in accordance with the function of the OS 303 (S503). In S503 described above, if it is determined that the result of the verification does not correspond to a normal value (an abnormal value) (S503, NO), the CPU 101 powers off the USB device 206 in accordance with the function of the OS 303 (S510). Specifically, the USB device 206 is powered off by performing off-control on the VBUS 202 via the CPLD 109 and the AND circuit 201 illustrated in FIG. 2. Note that, in this case, the OS 303 disables the USB device driver 305 and does not transfer the USB device firmware 306 to the USB device 206. That is, the image forming apparatus 1 is controlled to operate in a state that a use of the USB device 206 is restricted (an unused state in this example). Thereby, it is possible to reduce a risk of abnormal control caused by an unauthorized device driver that is altered or the like or suppress unnecessary power consumption caused by such a device.

On the other hand, in S503 described above, if it is determined that the result of the verification corresponds to a normal value (S503, YES), the CPU 101 starts an operation of the USB device driver 305 on the RAM 104 in accordance with the function of the OX 303 (S504).

Subsequently, the CPU 101 performs a verification operation on the USB device firmware 306 in accordance with the function of the USB device driver 305 or the OS 303.

First, the CPU 101 reads out the USB device firmware 306 on the HDD 103 and loads the USB device firmware 306 on the RAM 104 in accordance with the function of the USB device driver 305 or the OS 303 (S505).

Next, the CPU 101 verifies the USB device firmware 306 in the same manner as S502 described above in accordance with the function of the USB device driver 305 or the OS 303 (S506).

Next, the CPU 101 performs determination on the result of the verification of S506 described above in accordance with the function of the USB device driver 305 or the OS 303 (S507). If it is determined that the result of the verification corresponds to a normal value (S507, YES), the CPU 101 transfers the USB device firmware 306 to the USB device 206 in accordance with the function of the USB device driver 305 (S508). Upon the completion of transfer, the CPU 101 starts the operation of the USB device firmware 306 in accordance with the function of the USB device driver 305 (S509) and ends the process of this flowchart. Thereby, the USB device 206 is activated.

On the other hand, in S507 described above, if it is determined that the result of the verification does not correspond to a normal value (an abnormal value) (S507, NO), the CPU 101 transfers the process to S510. In S510, the CPU 101 powers off the USB device 206 via the CPLD 109 and the AND circuit 201 in accordance with the function of the USB device driver 305 or the OS 303. Note that, in this case, the USB device driver 305 or the OS 303 does not transfer the USB device firmware 306 to the USB device 206. That is, the image forming apparatus 1 is controlled to operate in a state that a use of the USB device 206 is restricted (an unused state in this example). Thereby, it is possible to reduce a risk of unauthorized firmware that is altered or the like being loaded on a device resulting in abnormal control of the device or suppress power from being unnecessarily consumed by the device in a state that no firmware is present.

Note that, in S404 of FIG. 4, the same process as described above is performed on the device driver of each device. However, the operations of S505 to S509 are not performed on a device having no firmware transferred to the device and operating on the device.

Note that, while the USB device and control software thereof (a device driver of a USB device and firmware operating on the USB device in this example) have been described as an example embodiment of the present disclosure, embodiments of the present disclosure are not limited to cases where a USB device is used. Embodiments of the present disclosure are applicable to any device and control software thereof that involve a device externally connected to a system and control software thereof.

As described above, control software of a device externally connected to the system is verified, and when the software is abnormal (unauthorized), execution of the control software, transfer of the control software to the device, and power supply to the device are restricted (prevented). Thereby, it is possible to reduce a risk of abnormal control caused by execution of unauthorized control software that is altered or the like. Further, it is possible to reduce a risk of unauthorized control software being loaded on a device resulting in abnormal control of the device or suppress power from being unnecessarily consumed by the device in a state that no normal control software is present or the like. That is, when control software of a device externally connected to the system is verified and the result of verification corresponds to the abnormal value, the power and the function of the external device can be suppressed, which can suppress power consumption or prevent an abnormal operation.

Second Embodiment

In the present embodiment, a case where an external device can be partially controlled by only the device driver even without firmware and can be used with a limited function (degenerate operation is possible) will be described. In such a case in a second embodiment, unlike the first embodiment, when the device driver is normal, the external device is not completely powered off, and the external device is used while the external device remains to be powered maintaining a function restricted state. Since the second embodiment is different from the first embodiment in only the activating process of a device driver (the activating process of an external device), only the function thereof will be described, and the description of the same configuration will be omitted.

Figure 6:
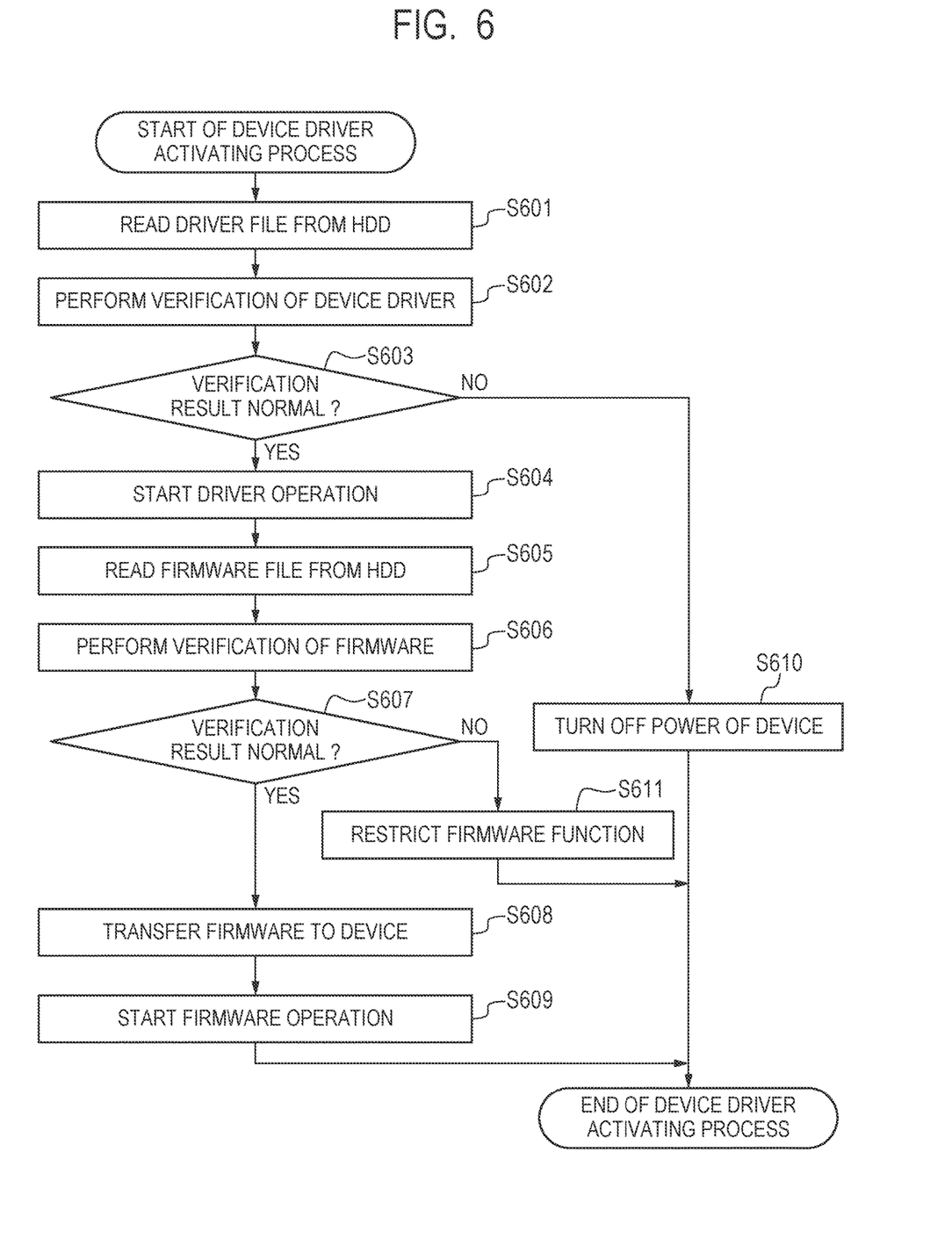
FIG. 6 is a flowchart illustrating an example of an activating process of the external device according to a second embodiment.

FIG. 6 is a flowchart illustrating an example of an activating process of the device driver in the second embodiment. In this activating process of a device driver, verification of the device driver and the firmware of an external device (for example, a USB device) is performed, and the activating process of the device or the degenerate operation control is performed based on the result thereof. Note that this process is performed at least any one of the time when the image forming apparatus 1 is activated, a case where connection of an external device to the main body of the image forming apparatus 1 is detected, and a case where update of a device driver or firmware is detected.

Note that, the USB device firmware 306 in the present embodiment is firmware that controls the USB device 206 when the image forming apparatus 1 is in a power saving state, for example. Therefore, the function of the USB device 206 that operates when the image forming apparatus 1 is in a normal power state can operate without a functional problem even when the USB device firmware 306 is absent.

Therefore, in the present embodiment, when the USB device driver 305 is abnormal, since the USB device 206 cannot be controlled at all, the USB device 206 is powered off in the same manner as in the first embodiment. On the other hand, when the USB device driver 305 is normal but the USB device firmware 306 is unauthorized, only the function associated with the USB device firmware 306 is restricted and operated with a limited function other than the restricted function. This will be described below in detail by using FIG. 6.

First, since the operations of S601 to S606, S610, and S607 (YES) to S609 of FIG. 6 are the same as the operations of S501 to S506, S510, and S507 (YES) to S509 of FIG. 5, the description thereof will be omitted. Only the case where S607 is NO is described below.

If S607 is NO, in accordance with the function of the USB device driver 305, the CPU 101 restricts the function associated with the USB device firmware 306 and controls the USB device 206 to operate with a limited function other than the restricted function (S611). That is, the image forming apparatus 1 is controlled to operate in a state that a use of USB device 206 is restricted. Note that, in this case, the USB device driver 305 or the OS 303 performs control not to transfer the USB device firmware 306 to the USB device 206.

As the control to operate the image forming apparatus 1 with a restricted use of the USB device 206 described above, specifically, the CPU 101 changes the setting value so as to restrict transition of the image forming apparatus 1 to a power saving state in S611. The image forming apparatus 1 is not caused to transition to a power saving state, and thereby the USB device 206 can be operated without using the function associated with the USB device firmware 306 that functions in a power saving state. Alternatively, while transitions of the image forming apparatus 1 to the power saving state is allowed, the setting value of power supply for the USB device 206 is changed so that the USB device 206 is not powered when the image forming apparatus 1 is in the power saving state. Thereby, unnecessary power consumption by the USB device 206 disabled in the power saving state can be suppressed in the power saving state of the image forming apparatus 1. That is, when the USB device driver 305 is normal but the USB device firmware 306 is unauthorized (abnormal), only the function associated with the USB device firmware 306 is restricted. The USB device 206 is then operated with a function that can be implemented by the USB device driver 305.

As described above, control software that operates on a device externally connected to the system is verified, and when the control software is abnormal, transfer of the control software to the device is not performed and the function of the device associated with the firmware is restricted. Thereby, it is possible to suppress a risk of unauthorized control software that is altered or the like being executed on a device resulting in abnormal control or the like. That is, when control software of a device externally connected to the system is verified and the verification result corresponds to an abnormal value, the power or the function of the external device can be suppressed, which can suppress power consumption or prevent an abnormal operation.

As described above, in each of the embodiments, when software (for example, the USB device driver 305 or the USB device firmware 306) is determined to be abnormal by verification, control is performed to not operate (neither execute nor transfer) the software. Furthermore, the image forming apparatus 1 is operated in a state of where a use of a device (for example, the USB device 206) corresponding to the software is restricted (a power off state or a function restricted state). It is therefore possible to reduce a risk of abnormal control of a device caused by abnormal software that is altered or the like or suppress unnecessary power consumption of a device that does not operate normally.

Note that, the configurations of various data and the contents thereof described above are not limited to the above and may be formed of various configurations and contents in accordance with application and a purpose.

While one embodiment has been illustrated above, other embodiments can take a form of a system, a device, a method, a program, or a storage medium or the like, for example. Specifically, embodiments of the present disclosure may be applied to a system formed of a plurality of devices and may be applied to an apparatus formed of a single device.

Further, all the configurations combining some of the embodiments described above are encompassed within the scope of the present disclosure.

Other Embodiments

Various embodiments of the present disclosure can also be realized by a process that supplies a program that implements one or more functions of the embodiments described above to a system or a device via a network or a storage medium and reads and executes the program by one or more processors of a computer in a system or an apparatus. Further, various embodiments of the present disclosure can be realized by a circuit (for example, ASIC) that implements one or more functions.

Further, various embodiments of the present disclosure can be applied to a system formed of a plurality of devices and can be applied to an apparatus formed of a single device.

The present disclosure is not limited to the embodiments described above, various modifications (including an organic combination of some of the embodiments) are possible based on the spirit of the present disclosure, and such modifications are not outside the scope of the present disclosure. That is, all the configurations combining some of the embodiments described above and modifications thereof are included within the scope of the present disclosure.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095587, filed May 17, 2018, which is hereby incorporated by reference herein in its entirety.

What is claimed is:

1. An information processing apparatus that is capable of connecting to an external device, comprising:
   a controlling unit configured to control power supply to the external device;
   a storing unit configured to store firmware of the external device;
   a transferring unit configured to transfer the firmware to the external device at a predetermined timing; and
   a detecting unit configured to detect alteration of the firmware stored in the storing unit, wherein
   in a case where the alteration of the firmware is detected by the detecting unit, the controlling unit is configured to cause the transferring unit to not transfer the firmware to the external device and stop the power supply to the external device.

2. The information processing apparatus according to claim 1, wherein the detecting unit is configured to perform the detection of the firmware in at least one of the following: a case where the information processing apparatus is activated, a case where connection of the external device to a main body of the information processing apparatus is detected, or a case where update of the firmware is detected.

3. The information processing apparatus according to claim 1, wherein the information processing apparatus is an image forming apparatus.

4. The information processing apparatus according to claim 1, wherein
the controlling unit is connected to the external device via a plurality of signal lines and stops the power supply to the external device by stopping the power supply via the plurality of signal lines.

5. The information processing apparatus according to claim 1, wherein
the transferring unit is connected to the external device via a plurality of signal lines and transfers the firmware to the external device via the plurality of signal lines.

6. The information processing apparatus according to claim 1, wherein
in a case where it is not detected by the detecting unit that the firmware is abnormal, the controlling unit is configured to transfer the firmware to the external device by the transferring unit.

7. The information processing apparatus according to claim 1, wherein
the firmware of each external device includes at least one of a first classification of firmware that operates on the controlling unit and controls the corresponding external device and a second classification of firmware that is transferred to the corresponding external device, operates on the external device, and controls the external device, and
in a case where it is detected by the detecting unit that the first classification of firmware is abnormal, the controlling unit is configured to power off the external device corresponding to the firmware, and, in a case where it is detected by the detecting unit that the second classification of firmware is abnormal, the controlling unit is configured to cause the external device corresponding to the firmware to operate with a limited function other than a function implemented by the firmware.

8. The information processing apparatus according to claim 7, wherein, in the case where it is detected that the first classification of firmware is abnormal, the controlling unit is configured not to activate the firmware, and, in the case where it is detected that the second classification of firmware is abnormal, the controlling unit is configured not to transfer the firmware to the external device corresponding to the firmware.

9. The information processing apparatus according to claim 1, wherein
the external device is connected to a main body of the information processing apparatus via a plurality of signal lines including a power line that receives power supply, and
the controlling unit is configured to power off the device by stopping the power supply via the power line.

10. The information processing apparatus according to claim 9, wherein the plurality of signal lines are signal lines supported by a specification of a USB standard, and
the external device is a USB device connected to the main body.

11. The information processing apparatus according to claim 1, wherein, in a case where it is detected by the detecting unit that the firmware is abnormal, the controlling unit is configured to cause the external device corresponding to the firmware to operate with a limited function other than a function implemented by the firmware.

12. The information processing apparatus according to claim 11, wherein, in a case where the firmware detected to be abnormal by the detecting unit is firmware that controls the external device when a main body of the information processing apparatus is in a power saving state, the controlling unit is configured to prevent the main body from transitioning to the power saving state.

13. The information processing apparatus according to claim 11, wherein, in a case where the firmware detected to be abnormal by the detecting unit is firmware that controls the external device when a main body of the information processing apparatus is in a power saving state, the controlling unit is configured to perform control to power off the device corresponding to the firmware when the main body transitions to the power saving state.

14. A control method for an information processing apparatus having a main body that is capable of connecting to an external device, a controlling unit that controls power supply to the external device, and a storing unit that stores firmware of the external device, the control method comprising:
verifying the firmware;
in a case where the firmware is not detected to be abnormal in the verification, transferring the firmware to the external device at a predetermined timing; and
in a case where the firmware is detected to be abnormal in the verification, not transferring the firmware to the external device and stopping the power supply to the external device.

15. A non-transitory computer readable storage medium storing a program for causing a computer to perform a control method for an information processing apparatus having a main body that is capable of connecting to an external device, a controlling unit that controls power supply to the external device, and a storing unit that stores firmware of the external device, the control method comprising:
verifying the firmware;
in a case where the firmware is not detected to be abnormal in the verification, transferring the firmware to the external device at a predetermined timing; and
in a case where the firmware is detected to be abnormal in the verification, not transferring the firmware to the external device and stopping the power supply to the external device.

* * * * *